United States Patent [19]
Ahmad

[11] Patent Number: 5,925,127
[45] Date of Patent: Jul. 20, 1999

[54] METHOD AND SYSTEM FOR MONITORING THE USE OF RENTED SOFTWARE

[75] Inventor: Arshad Ahmad, Bellevue, Wash.

[73] Assignee: Microsoft Corporation, Redmond, Wash.

[21] Appl. No.: 08/831,801

[22] Filed: Apr. 9, 1997

Related U.S. Application Data

[51] Int. Cl.[6] .................................................. G06F 11/00
[52] U.S. Cl. ............................................................ 713/200
[58] Field of Search .............................. 395/182.01, 186, 395/188.01, 187.01; 380/3, 9, 23, 25; 707/203, 9, 10; 702/203, 9, 10

[56] References Cited

U.S. PATENT DOCUMENTS

| | | | |
|---|---|---|---|
| 4,924,378 | 5/1990 | Hershey et al. | 364/200 |
| 5,375,206 | 12/1994 | Hunter et al. | 395/200 |
| 5,438,508 | 8/1995 | Wyman | 364/401 |
| 5,499,340 | 3/1996 | Barritz | 395/184.01 |
| 5,671,412 | 9/1997 | Christiano | 395/615 |
| 5,708,709 | 1/1998 | Rose | 380/4 |
| 5,717,604 | 2/1998 | Wiggens | 364/514 C |
| 5,745,879 | 4/1998 | Wyman | 705/1 |
| 5,758,069 | 5/1998 | Olsen | 396/187.01 |
| 5,890,664 | 8/1998 | Coley et al. | 380/4 |

OTHER PUBLICATIONS

Kramer, Matt, "For Rent: Apps Over Net," *PC Week,* Apr. 21, 1997, p. 16.

*Primary Examiner*—Joseph E. Palys
*Attorney, Agent, or Firm*—Jones & Askew, LLP

[57] ABSTRACT

A method and system for monitoring the use of a rented software program module. A rented software program module is downloaded from an Internet site operated by an authorized software rental service provider along with a Check-in/Check-out module and a Software Monitor module. The Check-in/Check-out module provides required licensing information for the rented software program module to the Software Monitor module. The Software Monitor module monitors use of the rented software program module while it is in use by the user. Particularly, the Software Monitor prevents use of the rented software program module after the expiration of the licensed usage time or licensed number of uses. The Software Monitor prevents unauthorized copying of the software program module. The desired software program module may be rented on a pay-per-use basis.

24 Claims, 6 Drawing Sheets

Fig. 3

Fig_4

METHOD AND SYSTEM FOR MONITORING THE USE OF RENTED SOFTWARE

FIELD OF INVENTION

The present invention relates generally to a method and system for monitoring the use of a software program module, and particularly, relates to a method and system for monitoring the use of a rented software program module.

BACKGROUND OF THE INVENTION

Since the dawning of the computer age, users of computers have quickly come to rely on a variety of software program modules to assist them in their daily work or play. Typically, a computer user purchases software program modules for use on his or her home or office computer. Familiar software program modules include word processing applications, data spreadsheet applications and computer games. Unfortunately, software program modules can be very expensive, and the prospective user may only desire use of a particular program module for a brief period of time. For example, a business may require the use of a tax application only during its year-end tax return preparation. Likewise, a person may desire to be entertained by a particular computer game only for a few hours.

To solve these needs, a variety of computer software program modules may be rented for specified periods of time from a variety of sources, such as local consumer electronics retailers, computer program retailers, or from television video and computer games vendors. However, a problem with the rental of software program modules arises because typically the renter/user has physical control of the program module on some media such as a floppy disk. Unfortunately, the renter/user often copies the program lo module onto a personal floppy disk or onto the hard drive of his or her computer. Thus, the renter/user can thwart the program module owner's copyrights and the license agreements between the program module owner and the rental service provider.

Additionally, the rental service provider has very little control over the amount of use that is made of a particular program module because it is impractical to rent program modules for small periods and because the rental service provider has no way of monitoring use of the program module. Moreover, attempts to pre-program a set period of use, such as four hours, may be easily thwarted by resetting the system clock of the user's computer.

In the prior art, non-software pay-per-use systems are available in such areas as the familiar television pay-per-use example. Pay-per-use television is mostly restricted to one-time viewing, such as a single movie or sports event. Some pay-per-use systems include standard hourly rates, daily rates, or weekend. rates. Unfortunately, as with the rental of software program modules, little has been done to prevent the renter of such pay-per-use programs from illegally copying the programs for subsequent unpaid and unlicensed use.

Therefore, there is a need in the art for a software program module rental method and system that allow the rental service provider to monitor the use of rented software program modules.

There is also a need in the art for a software program module rental method and system that allow the rental service provider to rent a particular software program module for a set period and to prevent the renter/user of that program module from unauthorized extension of the rental period.

There is also a need in the art for a software program module rental method and system that allow the rental service provider to rent a particular software program module and prevent unauthorized copying of that software program module by the renter/user.

There is a further need in the art for a software program module rental method and system that allow software applications to be rented on a pay-per-use basis from a remote rental service provider while allowing the rental service provider to monitor use of the rented software application.

SUMMARY OF THE INVENTION

The present invention satisfies the above described needs by providing a method and system for monitoring the use of a rented software program module. A desired software program module is registered with a central registration site called a Software Registry. The software program module is downloaded along with a Check-in/Check-out module and a Software Monitor module. All three software modules may be downloaded from a remote server operated by an authorized vendor of the software program module via the Internet. The Check-in/Check-out module provides required licensing information for the rented software program module to the Software Monitor module. The Software Monitor module monitors use of the rented software program module while it is in use by the user. The desired software program module may be rented on a pay-per-use basis.

Generally described, in one aspect, the present invention provides a method for monitoring the use of a computer program. The method includes verifying the user's license to use the computer program during a licensed time of use. An authorization message is issued to the computer program which allows the computer program to be used by the user. The use of the computer program is tracked during the licensed use. Use of the computer program may be terminated after the elapse of the licensed use. The step of tracking the use of the computer program during the licensed time of use may include preventing unauthorized copying of the computer program.

The step of verifying the license to use the computer program can be accomplished by causing the computer program to call a Software Monitor module for monitoring the computer program and determining whether the Software Monitor module is active. If the computer program determines the Software Monitor module is active, the computer program sends identification information about the computer program to the Software Monitor module. In response to receipt of the identification information about the computer program, the Software Monitor module determines whether the computer program is licensed for use. If the computer program determines the Software Monitor module is not active, the computer program issues an error message to indicate an error state.

The step in which the Software Monitor module determines whether the computer program is licensed for use may include causing the Software Monitor module to compare the identification information about the computer program sent by the computer program with identification information about the computer program maintained by the Software Monitor module. In response to the comparison, the Software Monitor module may determine whether the information about the computer program sent by the computer program matches the identification information about the computer program maintained by the Software Monitor module.

The step of tracking the use of the computer program during the licensed use can include the Software Monitor module starting a timer to record the time of use of the computer program. The computer program may query the Software Monitor module as to whether a licensed time of use has expired. In response to the query, the Software Monitor module can determine whether the licensed time of use has expired. The Software Monitor module may determine whether the licensed time of use has expired by reading the elapsed time of use recorded by the timer and comparing the elapsed time of use with the licensed time of use.

Alternatively, the step of tracking the use of the computer program during the licensed use can include the Software Monitor module starting a counter to record the total number of uses of the computer program; querying the Software Monitor module as to whether the licensed number of uses has been expended; and in response to the query, causing the Software Monitor module to determine whether the licensed number of uses has been expended. The step of causing said Software Monitor module to determine whether the licensed number of uses has been expended, comprises the steps of reading the total number of uses recorded by the counter; and comparing the total number of uses with the licensed number of uses. The method may also prevent unauthorized copying of said computer program.

In another aspect of the present invention, a Check-in/Check-out (CICO) module, a computer program, and a Software Monitor module are launched onto a user's computer. The computer program is launched after the CICO module is launched. The CICO module provides licensing information for the computer program to the Software Monitor module. In response to the licensing information provided by the CICO module, the Software Monitor module authorizes use of the computer program. Preferably, the Software Monitor module stores the licensing information and deletes the CICO module after the Software Monitor module receives the licensing information from the CICO module.

Preferably the Software Monitor module also secures the CICO module from unauthorized use. The step of securing the CICO module from unauthorized use may include causing the Software Monitor module to generate a unique identification for the CICO module. The Software Monitor encodes the CICO module with the unique identification. The Software Monitor module stores the unique CICO module identification. After a first use of the CICO module, the Software Monitor module may prevent subsequent use of the CICO module by causing the Software Monitor to check whether the unique identification for the CICO module previously has been used.

Prior to the step of causing the Software Monitor module to generate a unique identification for the CICO module, the CICO module preferably sends an identification for the computer program to the Software Monitor module. The Software Monitor module may store the identification for the computer program in a database maintained by the Software Monitor module. The Software Monitor module also may request a CICO module identification (CID) from the CICO module. In response to the request, the CICO module sends a CID to the Software Monitor module. In response to receipt of the CID, the Software Monitor module may perform a database lookup for a previously stored CID matching the CID received from the CICO module. If the Software Monitor module finds a previously stored CID matching the CID received from the CICO module, the Software Monitor module may send an invalid message to the CICO module.

In another aspect of the present invention, a computer-readable medium is provided. A Software Monitor module for monitoring the use of a computer program is stored on the computer-readable medium. The Software Monitor module has instructions which, when executed by a computer, perform a number of steps. The Software Monitor module receives identification information for the computer program from a Check-in/Check-out (CICO) module. The Software Monitor module verifies the CICO module has not been previously used and receives licensing information from the CICO module for the computer program. The Software Monitor module verifies the license to use the computer program and issues an authorization message to the computer program. The Software Monitor module tracks the use of the computer program during the licensed use.

The step of tracking the use of the computer program during the licensed time of use may include preventing unauthorized copying of the computer program. That step may also include preventing use of the computer program after the expiration of the licensed time of use. Alternatively, that step may also include preventing use of the computer program after a licensed number of uses has been expended.

In another aspect of the present invention, a system for monitoring the use of a computer program is provided which includes a Software Monitor module and a Check-in/Check-out module. The CICO module is operative to transfer identification information for the computer program to the Software Monitor module and to transfer licensing information for the computer program to the Software Monitor module. The Software Monitor module is operative to receive the identification information from the CICO module, to receive the licensing information from the CICO module, to verify license to use the computer program during a licensed time of use, to issue an authorization message to the computer program, and to track the use of the computer program during the licensed time of use. The Software Monitor module may be further operative to determine whether the CICO module previously has been used, and to delete the CICO module after receiving the licensing information from the CICO module. The Software Monitor module may be further operative to prevent the computer program from running longer than the licensed time of use, and to prevent unauthorized copying of the computer program.

In another aspect of the present invention, a method for monitoring the use of a computer program rented via the Internet is provided. A computer program is registered on a Software Registry, and the Software Registry may be located on a remote server. The computer program is downloaded from a remote server to a local computing device via the Internet. A Check-in/Check-out (CICO) module and a Software Monitor module are also downloaded from the remote server to the local computing device via the Internet. Identification information for the computer program is received by the Software Monitor module from the CICO module. The Software Monitor module verifies that the CICO module has not been previously used. Licensing information is received by the Software Monitor module from the CICO module for the computer program and the license to use the computer program during a licensed time of use is verified. An authorization message is issued by the Software Monitor module to the computer program. The Software Monitor module tracks use of the computer program during the licensed time of use.

These and other features, advantages, and aspects of the present invention will be more clearly understood and appreciated from a review of the following detailed description of the disclosed embodiments and by reference to the appended drawings and claims.

DETAILED DESCRIPTION

The present invention is directed to a method and system for monitoring the use of a rented software program module by a rental service provider of that software program module. As will be understood, the present invention may be used for monitoring a variety of program modules, such as application programs, operating system modules, Internet browsers, etc. In an exemplary embodiment of the present invention, an application program, such as "WORD," version 8.0, produced by Microsoft Corporation of Redmond, Wash., may be rented by an end user for use during some specified period of time. The present invention allows a rental service provider to track the use of the rented software program module to prevent unauthorized extension of a licensed period of use and to prevent unauthorized copying of the rented software program module.

The detailed description which follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network.

The processes and operations performed by the computer include the manipulation of signals by a processor or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, calling, comparing, receiving, sending, transferring, transmitting, etc. which are often associated with manual operations performed by a human operator. The operations described herein are machine operations performed in conjunction with various input provided by a human operator or user that interacts with the computer.

Referring now to the drawings, in which like numerals represent like elements throughout the several figures, aspects of the present invention and the preferred to operating environment will be described.

Exemplary Operating Environment

Figure 1:
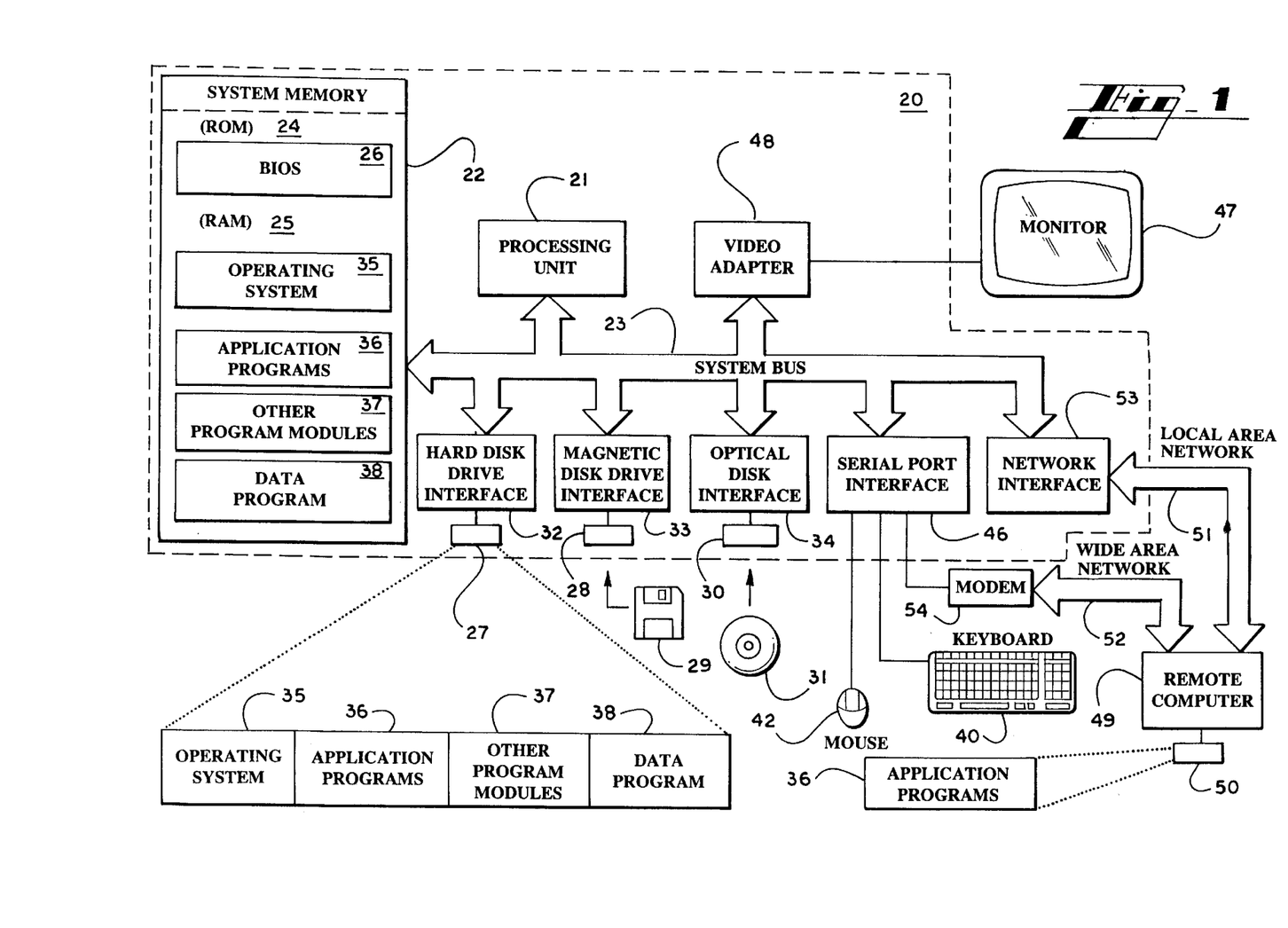
FIG. 1 is a block diagram of a computer that provides a portion of the operating environment for an exemplary embodiment of the present invention.

FIG. 1 and the following discussion are intended to provide a brief, general description of a suitable computing environment in which the invention may be implemented. While the invention will be described in the general context of an program module that runs on an operating system in conjunction with a personal computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more program modules 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

Figure 2:
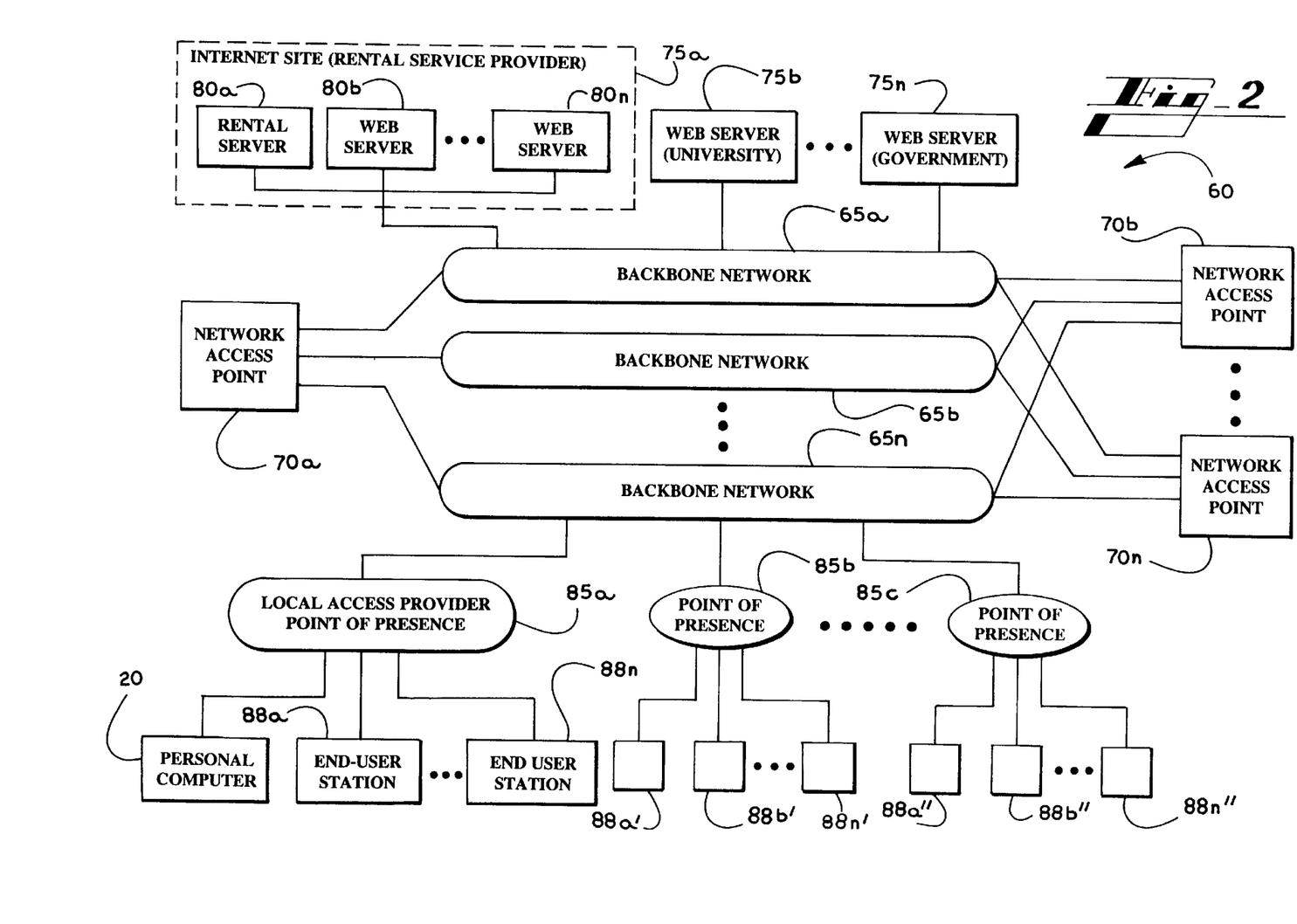
FIG. 2 is a functional block diagram of the Internet representing a portion of the operating environment of an exemplary embodiment of the present invention.

The personal computer 20 may operate in a to networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet, which is illustrated in FIG. 2.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

As will be discussed in detail below, an exemplary embodiment of the present invention provides for the downloading of rented software program modules from a remote server via the Internet. The Internet has in recent years become a mainstream commercial communication resource. E-mail and remote access to computer servers are currently widely used tools for reaching customers.

The participants in the Internet are a wide variety of machines, organizations, and individuals, all able to communicate and share information. Physically, the Internet is an interconnected collection of thousands of computer networks, tens of thousands of computers, and tens of millions of individual stations operated by end users. The user of the preferred embodiment of the present invention is preferably such an end-user. As is well known to those skilled in the art, to access an Internet site, an end user need only transmit the site's universal resource locator (URL) created in accordance with the standardized Domain Name System (DNS).

FIG. 2 is a functional block diagram of the Internet 60, a distributed computing network that provides a portion of the operating environment for the preferred embodiment of the present invention. The Internet 60 includes a plurality of backbone networks 65a through 65n. These backbone networks form an international grid of high-speed, high-capacity data communication lines interconnecting a number of massive computers that serve as large-scale processing points or nodes. The backbone networks 65 are interconnected with each other through a plurality of network access points 70a through 70n. These network access points are interfaces through which information is communicated from one backbone network to another. The configuration and operation of the Internet backbone is well known to those skilled in the art and will not be further described herein.

The Internet 60 includes a plurality of Internet sites 75a through 75n. These Internet sites are generally operated by corporations, universities, and governmental organizations. Each Internet site may include one or more repositories of information and resources that may be accessed over the Internet. Each Internet site, as represented by the Internet site 75a, may include a plurality of web servers 80a through 80n. Each of these web servers may provide "home pages" to be visited, files to be read or downloaded, applications to be shared, and the like.

The Internet 60 also includes a plurality of points of presence 85a through 85n that are operated by local access providers. These local access providers are in the business of providing Internet access to end user stations. In the preferred embodiment of the present invention, the personal computer 20, shown in FIG. 1, is an end-user station. As shown in FIG. 2, the point of presence 85a provides Internet access to the personal computer 20 (end user station) and other end user stations 88a through 88n, the point of presence 85b provides Internet access to end user stations 88a' through 88n', etc. All together, the points of presence 85 can provide Internet access to numerous end-user stations 88. Each point of presence 85, and each end user 88, may, but need not, provide home pages for access by others on the Internet 60.

Description of an Exemplary Embodiment

As briefly discussed above, the present invention allows a software program module rental service provider to monitor use of rented software program modules downloaded onto a user's computer from a memory storage device, such as a remote server 80a (FIG. 2) via the Internet. As is well known to those skilled in the art, software program modules may include a variety of programs, such as software applications, operating system modules, Internet browsers, utilities programs, etc. In an exemplary embodiment, the present invention is used to monitor the use of program modules downloaded to a user's computer over the Internet, from a remote server operated by the rental service provider.

Referring now to FIG. 2, a user desiring to rent a particular program module, logs onto the Internet, as discussed above, and accesses the Internet site 75a of the software rental service provider. The user then locates the rental server 80a at the Internet site 75a. The user completes a rental form provided on the server 80a and requests use of a particular program for a specified period of time. It should be understood that the form can also require payment information, such as a credit card number or an account number if the user has an established account with the rental service provider.

Program modules may be rented on a predetermined interval basis (e.g., hourly) and charged depending upon the length of time the user has the software checked out.

Alternatively, the user may be charged on an hourly usage rate basis where the user is charged when the program module is actually running. Alternatively, a usage count rate may be used where the user rents the program module for a fixed number of uses. For example, the user may pay for ten uses of a particular program module where a single use is consumed each time the program module is run on the user's computer. It should be understood that under the latter scheme, a maximum run time will be prescribed for each use to prevent the user from running the program module indefinitely under a single use. Alternatively, a system of version rental may be employed where the user will be charged for use of a specified version of the rented program module. Once a new version of the program module is released, the old version rented by the user will no longer run on the user's computer.

Figure 3:
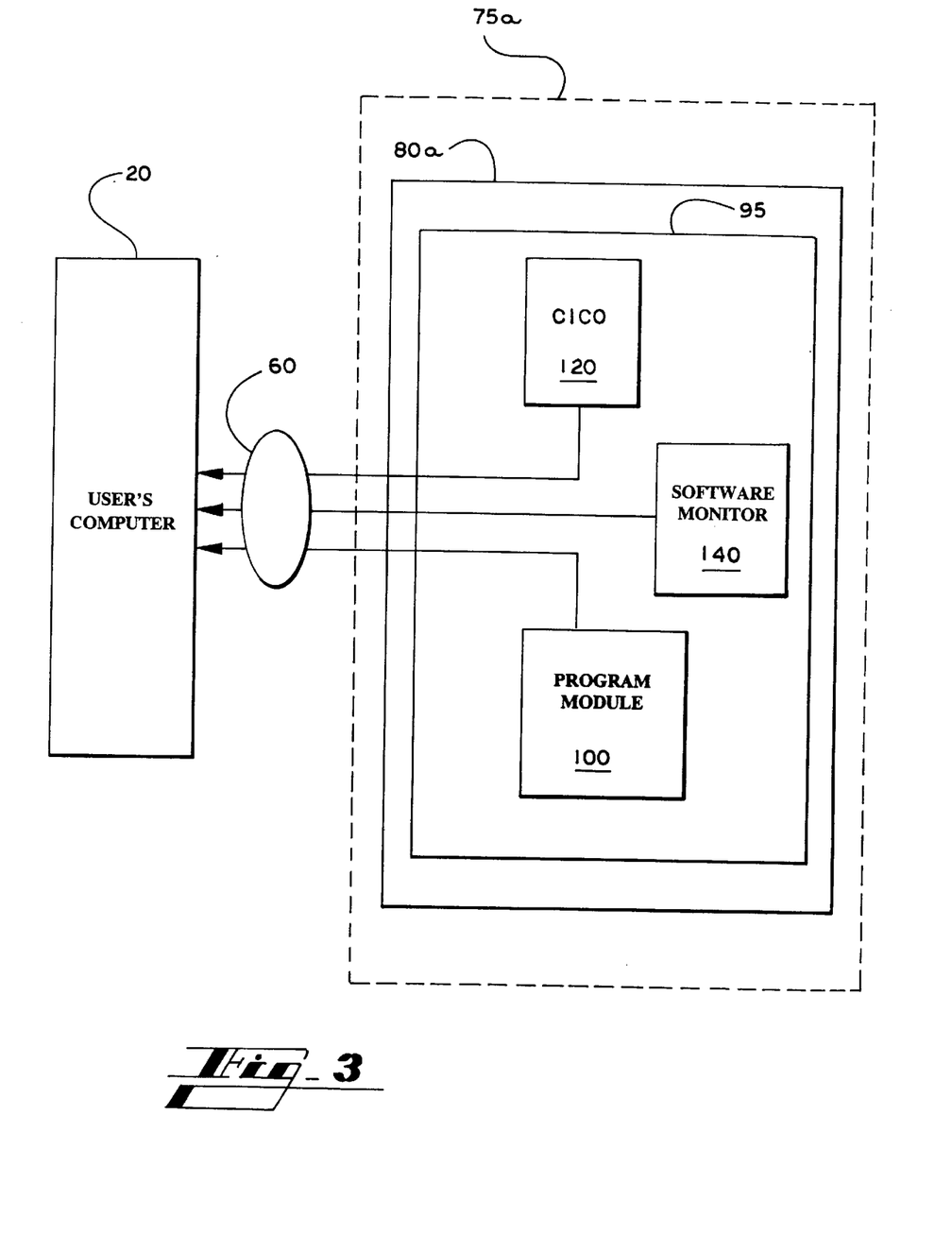
FIG. 3 is a simplified block diagram illustrating the downloading of software program modules from a remote server to a user's computer via the Internet.

FIG. 3 is a simplified block diagram illustrating the downloading of software program modules embodying an exemplary embodiment of the present invention from a remote server to a user's computer 20 via the Internet 60. Generally, as illustrated in FIG. 3, program modules available for rental are registered with a central registration site, such as a Software Registry 95. In the exemplary embodiment illustrated in FIG. 3, the Software Registry 95 is maintained on the program module rental server 88a. It should be understood that the Software Registry 95 may be maintained at a different location or remote server separate from the program module rental server 88a. It should also be understood that a variety of software program module owners or developers may register their program modules on the Software Registry 95 for rental to prospective users by the rental service provider. It should further be understood that any number of rental service providers may be authorized to rent a particular software program module which is registered with the Software Registry 95. Preferably, each rental service provider will rent that particular program module from their respective Internet servers.

After the rental form is completed by the user, the rental service provider issues from the rental server 80a an instance of a Check-in/Check-out (CICO) module 120 corresponding to the particular program module 100 requested by the user. As is discussed in detail below, the CICO module 120 contains required licensing information for the program module requested by the user.

The program module 100 and the corresponding CICO module 120 are downloaded from the server 80a (in no particular order) to the user's computer 20 over the Internet 60, illustrated in FIG. 3, in a manner well known to those skilled in the art. Both modules are typically stored on the user's hard disk drive, or some other form of non-volatile memory storage device. As is well known to those skilled in the art, one or both of the modules (program module 100 and CICO module 120) can be compressed to expedite the downloading process. That is, the program module 100 may, if desired, be appended to the CICO module 120 to form one module. That one module may be downloaded to the user's computer 20, as described above.

Once the program module 100 and the CICO module 120 are downloaded onto the user's computer 20, the CICO module 120 provides the licensing information to a Software Monitor module 140 that is resident on the user's computer 20. In the case of a single module combining the CICO module 120 and the program module 100, the CICO module 120 will run first to provide the required licensing information to the Software Monitor module 140. As is discussed in detail below, the Software Monitor module is a software application that monitors and ensures that use of the rented program module 100 by the user is in accordance with the licensing information provided by the CICO module 120. The operation and interaction of the processes and software program modules embodying the present invention discussed above will now be discussed in detail.

Referring now to FIGS. 2 and 3, as discussed above, before a particular program module 100 may be rented, that program module 100 must be registered on a Software Registry 95, which is a central registration site which may be maintained on the rental service provider's server 88a or separately from the rental service provider's server 88a. In response to registration on the Software Registry, the Software Registry assigns the program module 100 a unique identification number (APPID). For example, Microsoft "Word," version 8.0, would receive an APPID. If the program module 100 already has an assigned APPID, the Software Registry 95 will register this pre-assigned APPID, which is typically provided by the manufacturer of the program module 100. For example, the APPID can be a "Global Unique Identifier code" (GUID) assigned to selected program module titles by software manufacturers.

The CICO module 120 is a software program module responsible for providing licensing information for the rented program module 100 to the Software Monitor module 140 (discussed below) resident on the user's computer 20. The licensing information contained by the CICO module 120 includes the APPID and the licensed period of time over which the program module 100 may by used. The CICO module 120 is a tool that will encode this information on the user's computer 20 so that the Software Monitor module 140 can be made aware of the user's permission to use the program module 100, as well as the time period over which use of the program module 100 is allowed. It should be understood that a CICO module 120 is downloaded each time a program module is rented or renewed.

The CICO module 120 must be run on the user's computer 20 prior to running the rented program module 100 on the user's computer 20. In the preferred embodiment, the CICO module 120 is downloaded from the rental server 88a via the Internet, as described above. The CICO module 120 is preferably implemented as a dynamic-link library module (DLL) or as an Active X/OLE module (OCX). These types of modules are well known to those skilled in the art as modules that serve a specific function or set of functions which may be launched only when needed by a program that calls them. Preferably, the CICO module 120 is launched upon being downloaded to the user's computer 20. The mechanism for downloading and launching the CICO module 120 from the Internet is well known to those skilled in the art.

Because the CICO module 120 is a software application itself, it must be made secure from unauthorized copying or tampering before it can assist in securing the rented program module. Each CICO module has a CICO module identification number (CID). The CID preferably has two parts separated by a "-". As is discussed in detail below, the first part of the CID is a unique identification number generated and encode into the CICO module by the Software Monitor module 140, and the second part is the identification number unique to the user's computer 20. The Software Monitor module 140 verifies the CICO module 120 has not been used before and then issues a randomly generated unique CID to the CICO module 120. After the CICO module 120 provides the Software Monitor module 140 with the licensing information for the rented program module 100, the CICO module 120 is deleted by the Software Monitor module 140 to prevent any unauthorized copying of the CICO module 120.

Upon downloading the program module 100 and the CICO module 120 onto the user's computer 20, the program module 100 will load the Software Monitor module 140 (SM) for operation. As should be understood from the foregoing discussion, the SM 140 is a software program module or module that verifies the user's license to use the rented program module and tracks use of the rented program module by the user. Referring to FIG. 3, the SM 140 may be downloaded from the rental server 80a to the user's computer 20 at the time the program module 100 and the CICO module 120 are downloaded. Alternatively, the SM 140 may be resident on the user's computer 20 as part of software provided to the user on the computer's hard disk drive.

The SM 140 must run constantly on the user's computer 20 during use of the rented program module 100 to prevent unauthorized use of the rented program module 100. As with the CICO module 120, the SM 140 may be implemented as either a system DLL or an ActiveX control module. Once the CICO module 120 has been downloaded and secured by the SM 140, as discussed above, the CICO module 120 transfers to the SM 140 the license information for the rented program module. The data is transferred as bytes to the SM 140 in a manner well known to those skilled in the art. The SM 140 is responsible for interpreting and using the information. The task of the CICO module 120 is completed as soon as the information is transferred.

The SM 140 tracks the time of use of the program module 100 without the use of the computer's system clock because the computer's system clock may be easily changed by the user. The SM 140 utilizes an internal timer to track the actual elapsed time of use of the program module 100. The standard approach to calculating the time of use is to subtract the start time, i.e., the time the program module 100 is launched from the end time, i.e., the time the program module 100 is exited.

To further prevent the user from manipulating the system, the SM 140 may hook into the system clock of the computer 20 via the operating system, which offers system time and system date, to be notified each time the system clock is changed. Consequently, all changes to the system clock will be recorded and accounted for by the SM 140.

Alternatively, the SM 140 may track the number of uses of the program module 100 if the program module is rented for a specified licensed number of uses. The SM 140 may track the number of uses of the program module 100 by setting an internal counter, similar to the above-described internal timer, when the program module 100 is first used. Upon each subsequent licensed use, the counter will add one count. The SM 140 will compare the total count to the licensed number of uses each time the user attempts to launch the program module 100. After the licensed number of uses is expended the SM 140 will prevent subsequent operation of the program module 100.

For subsequent use of the program module 100, the SM 140 can remember that it deleted the CICO module 120 during the first use of the program module 100, and the SM 140 will not check for the CICO module 120 on the second (and future uses) of the program module 100 while time remains for use of the program module 100. For subsequent rental of the program module 100, there is no need to download the program module 100 again. However, there is a need to download the CICO module 120 again from the rental service provider's server each time the program module 100 is subsequently rented.

Unauthorized copying of the program module 100 is prevented by rendering the program module useless without the simultaneous operation of the Software Monitor 140. Because the program module 100 will not run without the simultaneous running of the SM 140, any unauthorized copy of the program module 100 launched on a different computer will be rendered useless because the SM 140 will recognize that the computer identifier for the different computer does not match the computer identifier stored as a part of the unique CID, described above. Accordingly, the SM 140 will not allow the unauthorized copy of the program module 100 to run.

Operation of an Exemplary Embodiment

The preferred method of the implementation and operation of the present invention will now be discussed with reference to FIGS. 4, 5(a) and 5(b). As discussed above, in an exemplary embodiment of the present invention, a user desiring to rent a particular program module logs onto the Internet and locates the rental service provider's server 80a at the Internet site 75a (FIG. 2). After completing the required rental form, the user downloads the desired program module 100, CICO module 120, and the Software Monitor (SM) 140 to the hard disk drive of his or her computer 20. At this point the CICO module will contain a default CID, such as "11111-11111" which will indicate to the SM 140 that this CICO module has not been previously used. The CICO module 120 will also contain the APPID for the rented program module 100 and licensing information for the program module 100. It should be understood this information is inserted into the CICO module 120 by software resident at the rental service provider's server 88a.

Figure 4:
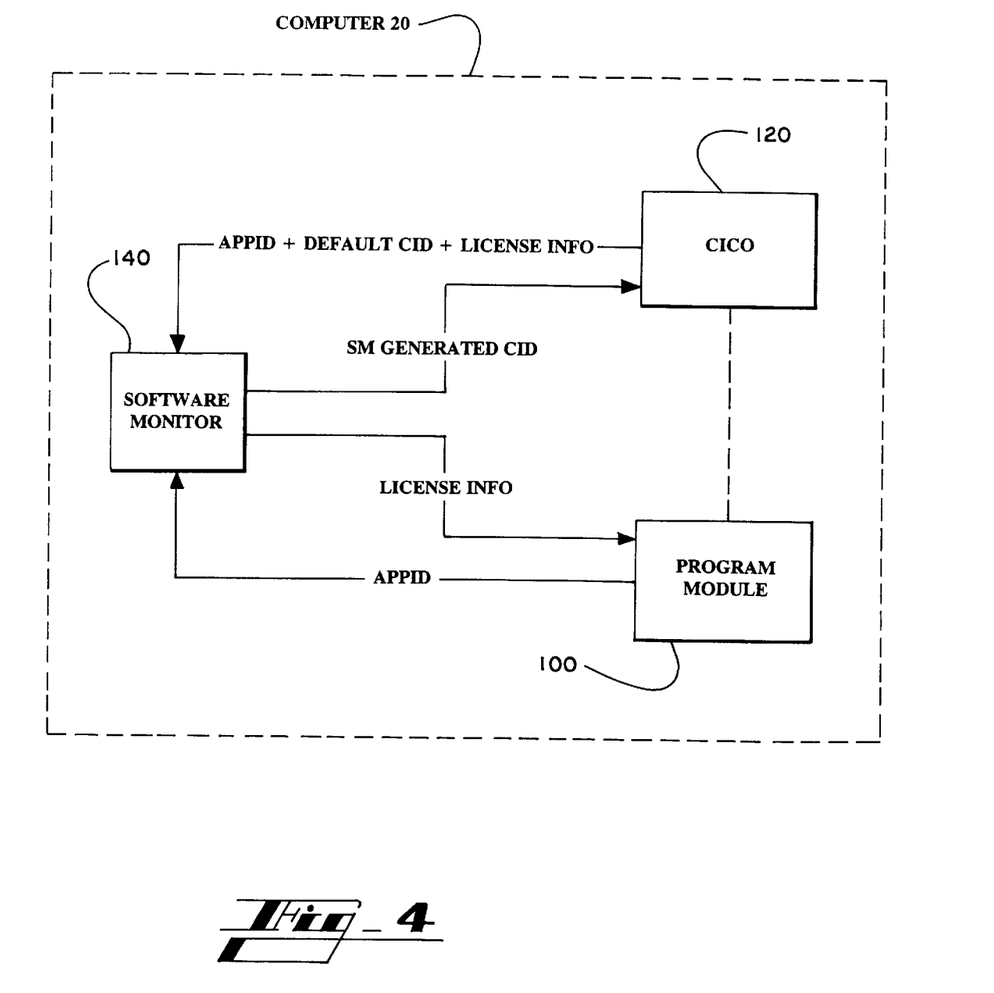
FIG. 4 is a simplified block diagram illustrating the interaction between three separate software program modules embodying an exemplary embodiment of the present invention.
Figure 5A:
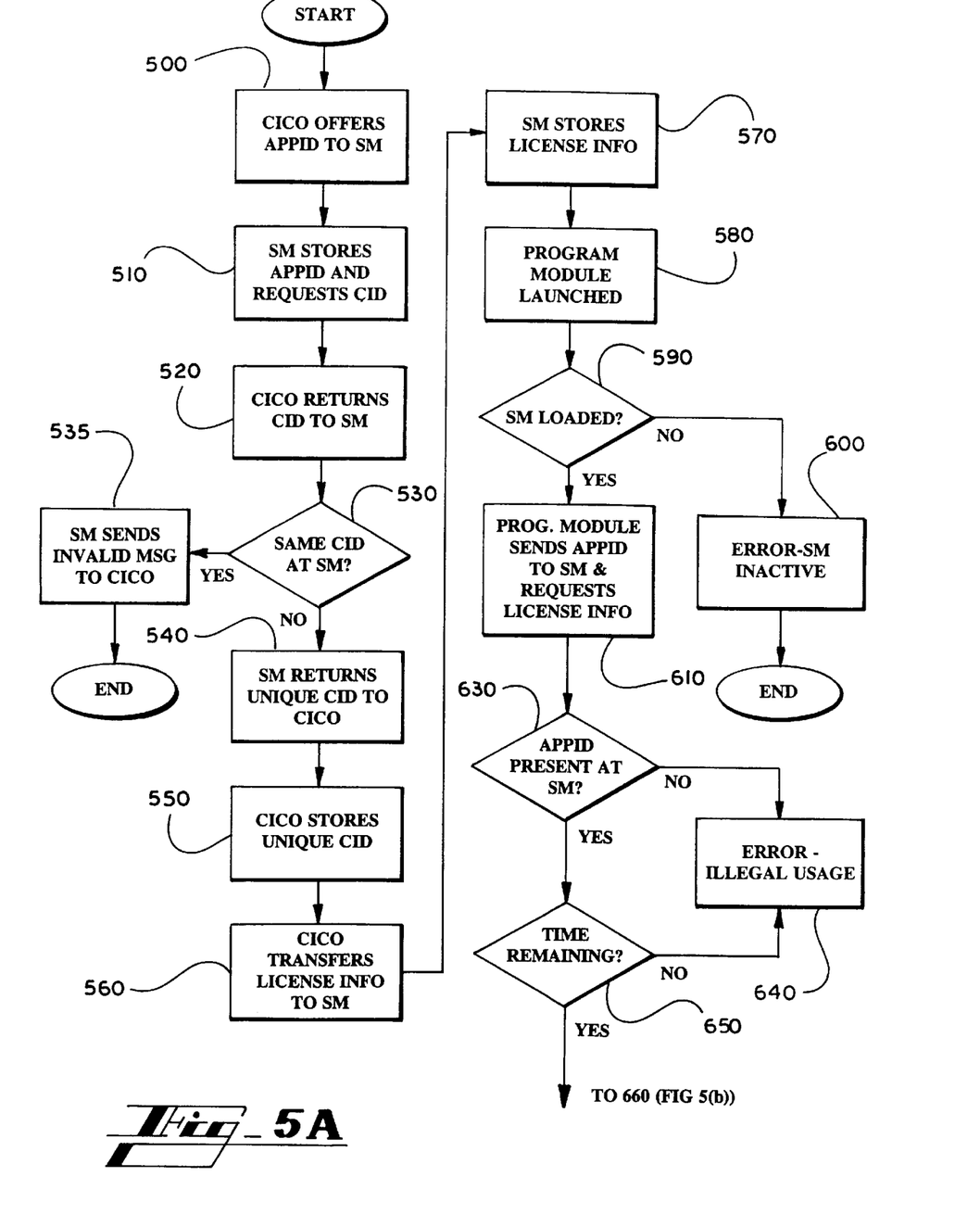
FIGS. 5(a) and 5(b) are flow diagrams illustrating the operation of an exemplary embodiment of the present invention.

Referring now to FIGS. 4 and 5(a), at step 500, the CICO module 120 calls the SM 140 and offers the APPID to the SM 140. At step 510, the SM 140 stores the APPID within its database and responds to the CICO module 120 by requesting the CID from the CICO module 120. At step 520, the CICO module 120 returns a two-part CID to the SM 140 which is typically comprised of an identifier for the CICO module 120 and a computer ID. On the first use of the CICO module 120, the value will represent a default value, such as "11111-11111," as described above. This default value is maintained as part of the database of the CICO module 120.

At decision step 530, in response to receipt of the CID from the CICO module 120, the SM 140 checks its database to determine if it has previously received this same CID. If the present CID matches a CID currently stored in the SM 140 database, the SM 140 follows the "YES" branch at step 530 to step 535 and returns an invalid message to the CICO module 120. An invalid message is returned here because the presence of the present CID in the SM 140 database indicates this CID has already been used on this computer 20 and that the user is attempting to re-use an expired program module 100. Accordingly, the SM 140 will not permit the CICO module 120 to insert license information into the SM 140 database. It should be understood that this previously used CID is maintained only for subsequent operations, such as verification that the user paid for the use of this program module 100. For example, if the CICO module 120 was corrupted on download, the user may get another copy of the CICO module 120 without paying again.

Alternatively, if the CID is not the default CID (i.e., 11111-11111), and the CID is not found in the SM 140 database, the SM 140 assumes that this CICO module 120 has been illegally copied and is already expended. Again, the SM 140 will not permit the CICO to insert license information into the SM 140 database even though the CID was not found in the database.

If the present CID is the default CID (which indicates this CICO module 120 has not been previously used), and if the present CID does not match any CID found in the SM 140 database, the method follows the "NO" branch to step 540, and the SM 140 returns to the CICO module 120 a value comprised of a unique identifier for this CICO module 120 and the actual system identifier for the user's computer 20.

The unique identifier for the CICO module 120 is generated by the SM 140 via a random number generator. The random number generator utilized by the SM 140 uses a random number generation scheme based on parameters available such as the date, time and computer system ID. The SM 140 maintains a copy of this value within its database for future use as required. As discussed above, the SM 140 can hook into the system clock of the user's computer 20 to obtain time and date parameters, typically via the operating system. The SM 140 can obtain the computer identifier from the computer's BIOS or via a peripheral device having an identifier, such as a network adapter identifier.

Referring still to FIGS. 4 and 5(a), at step 550, in response to the unique CID generated by the SM 140, the CICO module 120 stores the unique CID and passes its physical location to the SM 140. As is well known to those skilled in the art, the physical location of the CICO is typically its directory location, such as C:\CICO, on the hard disk drive of the user's computer 20. It should be understood that the CID may be stored at the same location as the program module 100 (e.g., C:\program module) or at the windows system directory in ActiveX/OLE type systems.

At step 560, the CICO module 120 transfers license information for the rented program module 100 to the SM 140. As is discussed above, the license information for the rented program module 100 includes the APPID for the rented program module 100 and the prescribed period of time over which the rented program module 100 may be used. At step 570, the SM 140 stores the license information in its encoded database.

At step 580, the rented program module 100 is launched on the user's computer. At step 590, the program module 100 queries the SM 140 for authorization to run on the user's computer 20. If the SM 140 has not been loaded, the method follows the "NO" branch to step 600 and the program module 100 determines the SM 140 is inactive and generates an error message to the user indicating an error state. As should be understood the error state may include a variety of reasons why the Software Monitor module is inactive. It should be understood from the foregoing discussion that the program module 100 cannot run unless the SM 140 is operational and has received the required licensing information from the CICO module 120. If the SM 140 has been loaded on the user's computer 20, the method follows the "YES" branch to step 610 and the program module 100 passes its APPID to the SM 140 and requests license information from the SM 140.

At decision step 630, the Software Monitor 140 checks its database to determine whether the APPID passed by the program module 100 is present. It should be understood that the APPID will be present in the SM 140 database if the CICO module 120 transferred that information to the SM 140 at step 560. If the APPID is not present in the SM 140 database, the method follows the "NO" branch to step 640, and the program module 100 will present an error message to the user corresponding to illegal usage of the program module 100. If the SM 140 finds the appropriate APPID in its database, the method follows the "YES" branch to decision step 650.

At decision step 650, the SM 140 checks its database to determine whether usage time remains for the rented program module 100. If no usage time remains for the rented program module 100, the method follows the "NO" branch to step 640, and the program module 100 will generate an error message to the user corresponding to illegal usage of the program module 100. If, at step 650, usage time does remain for the rented program module 100, the method follows the "YES" branch through step 660.

Figure 5B:
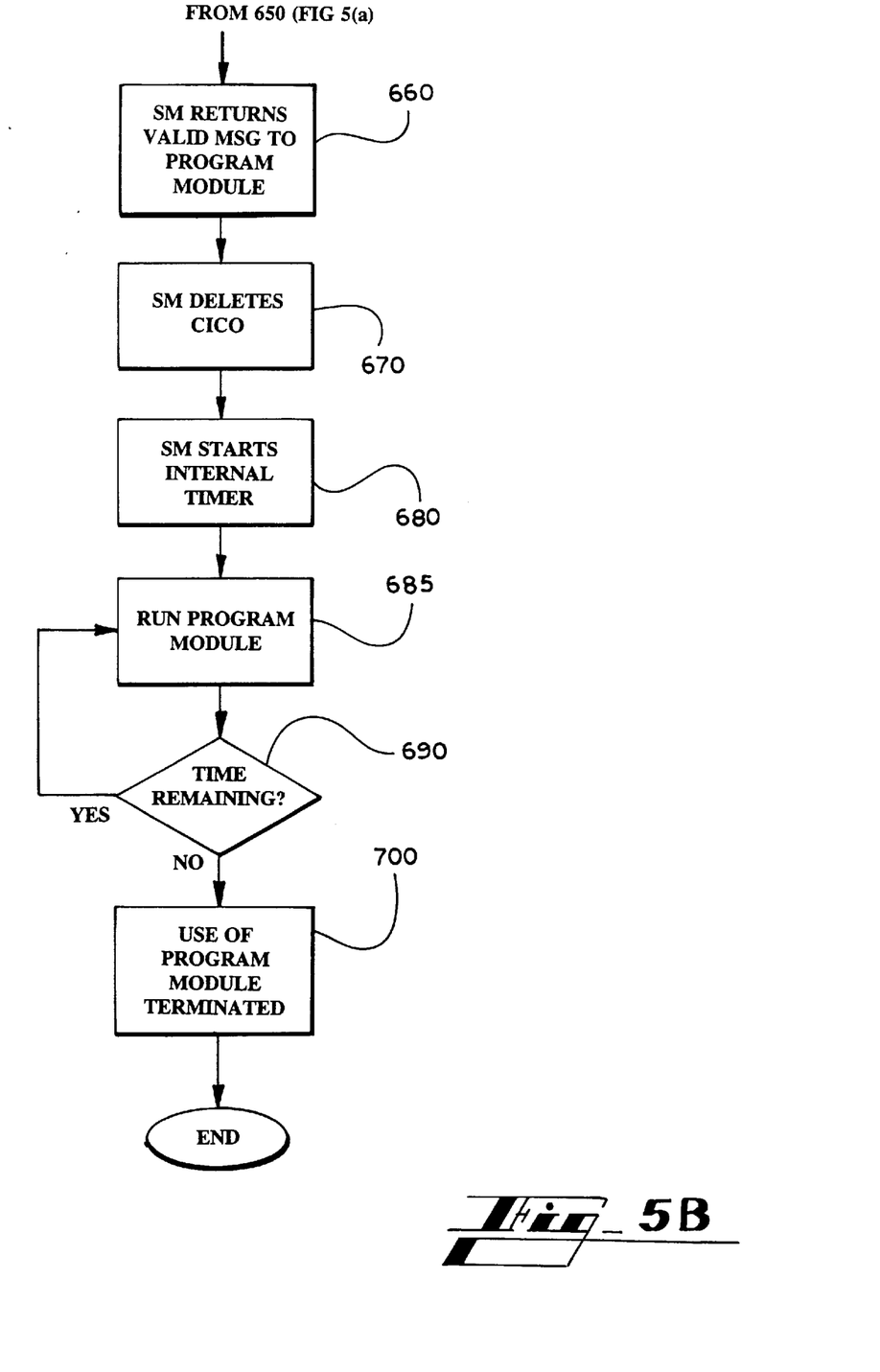

Referring now to FIGS. 4 and 5(b), at step 660, the SM 140 returns a valid message to the program module 100 to verify that use of the program module 100 is authorized.

At step 670, the SM 140 deletes the CICO module 120 at its known physical location. This prevents reuse of the CICO module 120. For example, deletion of the CICO module 120 prevents the user from making an unauthorized copy of the CICO module 120. If the CICO module 120 is transferred to a different computer, the computer ID will be double checked during the SM's generation of a unique CID, illustrated at step 540. Thus, the CICO module 120 will be prevented from running on the new machine because the SM will determine that the CICO module 120 has already been used by a different computer 20.

At step 680, and simultaneous with the user's execution of the program module 100 below, the SM 140 starts its internal timer to track the time of usage of the program module 100. The SM 140 preferably also hooks into the system clock of the user's computer 20, typically by use of an event handler, to detect whether the user tampers with the time and/or date of the system clock of the computer 20. At step 685, the user begins running the program module 100.

At decision step 690, the program module 100 queries the SM 140 to determine whether licensed usage time remains. The program module 100 may query the SM 140 on a regular or irregular basis. Alternatively, the SM 140 may simply notify the program module 100 when the licensed time of use has expired without receiving a query from the program module 100. In either situation, the SM 140 may, if desired, notify the program module and the user that some set amount of time, e.g. five minutes, remains. It should be understood that the program module 100 and the Software Module 140 may communicate with each other according to well known ActiveX/OLE protocols. In response to the query from the program module 100, the SM 140 compares the elapsed time recorded by its internal timer at the time of the query, with the licensed time of use stored in its database. If usage time remains, the method follows the "YES" branch, at step 690, and allows the user to continue use of the program module 100. If the licensed usage time has expired, the method follows the "NO" branch to step 700, and use of the program module 100 is terminated. If desired, a termination message may be sent to the user prior to termination of use of the program module 100.

It should be understood that the SM 140 will maintain an encrypted database in which it will store the APPID, the CID, and the usage time remaining. Therefore, if the user terminates use of the program module 100 while licensed usage time remains, the SM 140 will allow subsequent use of the program module 100 until the licensed usage time is expended. Accordingly, if the user launches the program module 100 for subsequent use, it is not necessary to download another CICO module from the rental service provider's server. Although the SM 140 deleted the CICO module 120 during the first use of the program module 100, as discussed above, the APPID, the CID, and the remaining usage time maintained in the SM 140 encrypted database allow the SM 140 to allow the program module 100 to run until the remaining usage time is expended. Accordingly, the SM 140 will allow subsequent use of the program module 100 until usage time is extended without the need for downloading a new CICO module.

After the licensed usage time has been expended, the user may re-rent the program module 100 for subsequent use. For subsequent rental of the program module 100 by the user, there is no need to download the program module 100 from the rental service provider's server, but a new CICO module must be downloaded from the real service provider's server for such subsequent rentals of the program module 100.

Advantageously, the present invention provides a method and system for monitoring the use of a rented software program module. While this invention has been described in detail with particular reference to exemplary embodiments thereof, it will be understood the variations and modifications can be affected within the spirit and scope of the invention as described herein and as defined in the appended claims.

What is claimed is:

1. A method for monitoring the use of a computer program, comprising the steps of:
    launching a check-in/check-out (CICO) module, said CICO module for providing licensing information for said computer program to a Software Monitor module;
    after launching said CICO module, launching said computer program;
    launching said Software Monitor module, said Software Monitor module for monitoring use of said computer program;
    causing said CICO module to provide said licensing information for said computer program to said Software Monitor module;
    in response to said licensing information provided by said CICO module, causing said Software Monitor module to authorize use of said computer program; and
    causing said Software Monitor module to delete said CICO module after said Software Monitor module receives said licensing information from said CICO module.

2. The method recited in claim 1, further comprising the step of causing said Software Monitor module to store sad licensing information.

3. The method recited in claim 1, wherein said step of launching said CICO module, comprises securing said CICO module from unauthorized use.

4. The method recited in claim 3, wherein said step of securing said CICO module from unauthorized use, comprises the steps of:
    causing said Software Monitor module to generate a unique identification for said CICO module;
    causing said Software Monitor module to encode said CICO module with said unique identification;
    causing said Software Monitor module to store said unique CICO module identification; and
    after a first use of said CICO module, preventing subsequent use of said CICO module by causing said Software Monitor to check whether said unique identification for said CICO module has been previously used.

5. The method recited in claim 4, prior to said step of causing said Software Monitor module to generate a unique identification for said CICO module, further comprising the steps of;
    causing said CICO module to send an identification for said computer program to said Software Monitor module;
    causing said Software Monitor module to store said identification for said computer program in a database maintained by said Software Monitor module;
    causing said Software Monitor module to request a CICO module identification (CID) from said CICO module;
    in response to said request, causing said CICO module to send a CID to said Software Monitor module;
    in response to receipt of said CID, causing said Software Monitor module to perform a database lookup for a previously stored CID matching said CID received from said CICO module; and
    if said Software Monitor module finds a previously stored CID matching said CID received from said CICO module, causing said Software Monitor module to send an invalid message to said CICO module.

6. A computer-readable medium on which is stored a Software Monitor module for monitoring the use of a computer program, said Software Monitor module comprising instructions which, when executed by a computer, perform the steps of:
    receiving identification information for said computer program from a check-in/check-out (CICO) module;
    verifying said CICO module has not been previously used;
    receiving licensing information from said CICO module for said computer program;
    verifying license to use said computer program;
    issuing an authorization message to said computer program to authorize use of said computer program; and
    tracking the use of said computer program.

7. The computer-readable medium recited in claim 6, wherein said step of tracking the use of said computer program comprises preventing unauthorized copying of said computer program.

8. The computer-readable medium recited in claim 6, wherein said step of tracking the use of said computer program comprises preventing use of said computer program after the expiration of a licensed time of use.

9. The computer-readable medium recited in claim 6, wherein said step of tracking the use of said computer program comprises preventing use of said computer program after a licensed number of uses has been expended.

10. A system for monitoring the use of a computer program, comprising:
    a Software Monitor module;
    a Check-in/Check out (CICO) module operative
        to transfer identification information for said computer program to said Software Monitor module, and
        to transfer licensing information for said computer program to said Software Monitor module;
    said Software Monitor module being operative
        to receive said identification information from said CICO module,
        to receive said licensing information from said CICO module,
        to verify license to use said computer program during a licensed time of use,
        to issue an authorization message to said computer program, and
        to track the use of said computer program during said licensed time of use.

11. The system recited in claim 10, wherein said Software Monitor module is further operative
    to determine whether said CICO module previously has been used, and
    to delete said CICO module after receiving said licensing information from said CICO module.

12. The system recited in claim 10, wherein said Software Monitor module is further operative
    to prevent said computer program from running longer than said licensed time of use, and
    to prevent unauthorized copying of said computer program.

13. A method for monitoring the use of a computer program rented via the Internet, comprising the steps of:
   registering said computer program on a software registry, said software registry located on a remote server;
   downloading said computer program from said remote server to a local computing device via the Internet;
   downloading a check-in/check-out (CICO) module from said remote server to said local computing device via said Internet;
   downloading a Software Monitor module from said remote server to said local computing device via said Internet;
   causing said Software Monitor module to receive identification information for said computer program from said CICO module;
   causing said Software Monitor module to verify said CICO module has not been previously used;
   causing said Software Monitor module to receive licensing information from said CICO module for said computer program;
   causing said Software Monitor module to verify license to use said computer program during a licensed time of use;
   causing said Software Monitor module to issue an authorization message to said computer program to authorize use of said computer program; and
   causing said Software Monitor module to track the use of said computer program during said licensed time of use.

14. A method for monitoring the licensed use of a computer program, comprising the steps of:
   receiving licensing information for said computer program from a check-in/check-out (CICO) module;
   in response to said licensing information, causing a Software Monitor module to verify said licensed use of said computer program;
   causing said Software Monitor module to issue an authorization message to said computer program to authorize use of said computer program;
   causing said Software Monitor module to delete said CICO module to prevent subsequent use of said CICO module; and
   causing said Software Monitor module to track the use of said computer program during said licensed use of said computer program.

15. The method recited in claim 14, further comprising the step of causing said Software Monitor module to send a termination message to said computer program to terminate use of said computer program.

16. The method recited in claim 15, further comprising the step of terminating the use of said computer program after the elapse of said licensed use.

17. The method recited in claim 14, wherein said step of causing a Software Monitor module to verify said licensed use of said computer program comprises the steps of:
   causing said computer program to determine whether said Software Monitor module is active;
   if said computer program determines said Software Monitor module is active, causing said computer program to send identification information about said computer program to said Software Monitor module; and
   in response to receipt of said identification information about said computer program, causig sad Software Monitor module to determine whether said computer program is licensed for use.

18. The method recited in claim 17, wherein said step of causing said computer program to determine whether said Software Monitor module is active, further comprises:
   if said computer program determines said Software Monitor module is not active, causing said computer program to issue an error message to indicate an error condition.

19. The method recited in claim 17, wherein said step of causing said Software Monitor module to determine whether said computer program is licensed for use, comprises:
   causing said Software Monitor module to compare said identification information about said computer program sent by said computer program with identification information about said computer program maintained by said Software Monitor module; and
   in response to said comparison, causing said Software Monitor module to determine whether said identification information about said computer program sent by said computer program matches said identification information about said computer program maintained by said Software Monitor module.

20. The method recited in claim 14, wherein said step of causing said Software Monitor module to track the use of said computer program during said licensed use of said computer program comprises the steps of:
   causing said Software Monitor module to start a timer to record an elapsed time of use of said computer program;
   querying said Software Monitor module as to whether a licensed time of use has expired; and
   in response to said query, causing said Software Monitor module to determine whether said licensed time of use has expired.

21. The method recited in claim 20, wherein said step of causing said Software Monitor module to determine whether said licensed time of use has expired, comprises the steps of:
   reading said elapsed time of use recorded by said timer; and
   comparing said elapsed time of use with said licensed time of use.

22. The method recited in claim 14, wherein said step of causing said Software Monitor module to track the use of said computer program during said licensed use of said computer program comprises the steps of:
   causing said Software Monitor module to start a counter to record a total number of uses of said computer program;
   querying said Software Monitor module as to whether a licensed number of uses has been expended; and
   in response to said query, causing said Software Monitor module to determine whether said licensed number of uses has been expended.

23. The method recited in claim 22, wherein said step of causing said Software Monitor module to determine whether said licensed number of uses has been expended, comprises the steps of:
   reading said total number of uses recorded by said counter; and
   comparing said total number of uses with said licensed number of uses.

24. The method recited in claim 14, wherein said step of causing said Software Monitor module to track the use of said computer program during said licensed use of said computer program comprises the step of preventing unauthorized copying of said computer program.

* * * * *